D. WALD, O. C. BRITSCH & M. TAIGMAN.
MOTOR CONTROL APPARATUS.
APPLICATION FILED APR. 23, 1910.
984,327.
Patented Feb. 14, 1911.
3 SHEETS—SHEET 1.
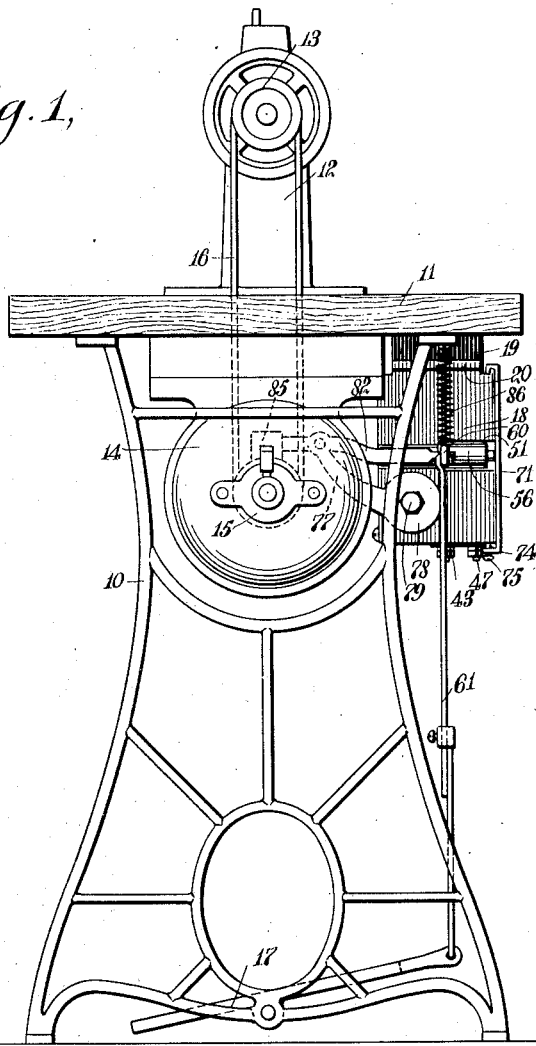
Fig. 1,
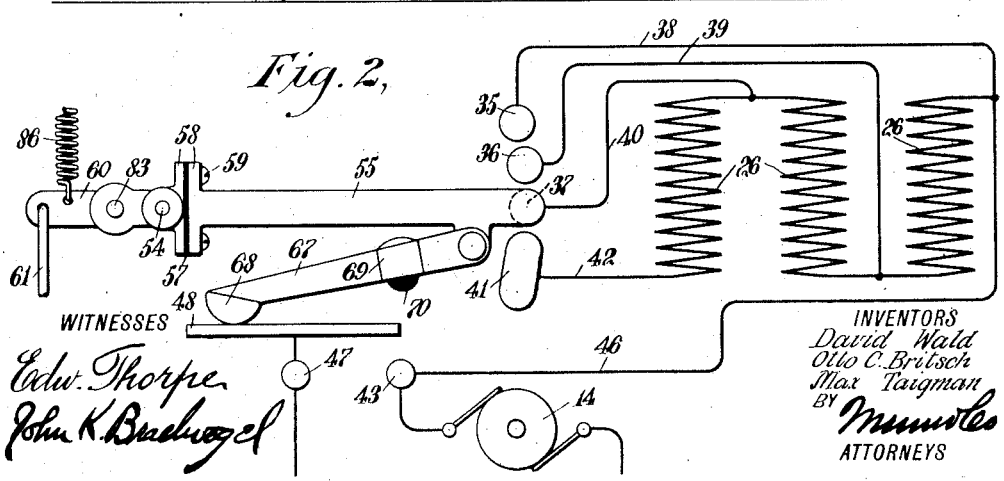
Fig. 2,
WITNESSES
Edw. Thorpe
John K. Buchvogel
INVENTORS
David Wald
Otto C. Britsch
Max Taigman
BY
ATTORNEYS D. WALD, O. C. BRITSCH & M. TAIGMAN.
MOTOR CONTROL APPARATUS.
APPLICATION FILED APR. 23, 1910.
984,327.
Patented Feb. 14, 1911.
3 SHEETS—SHEET 2.
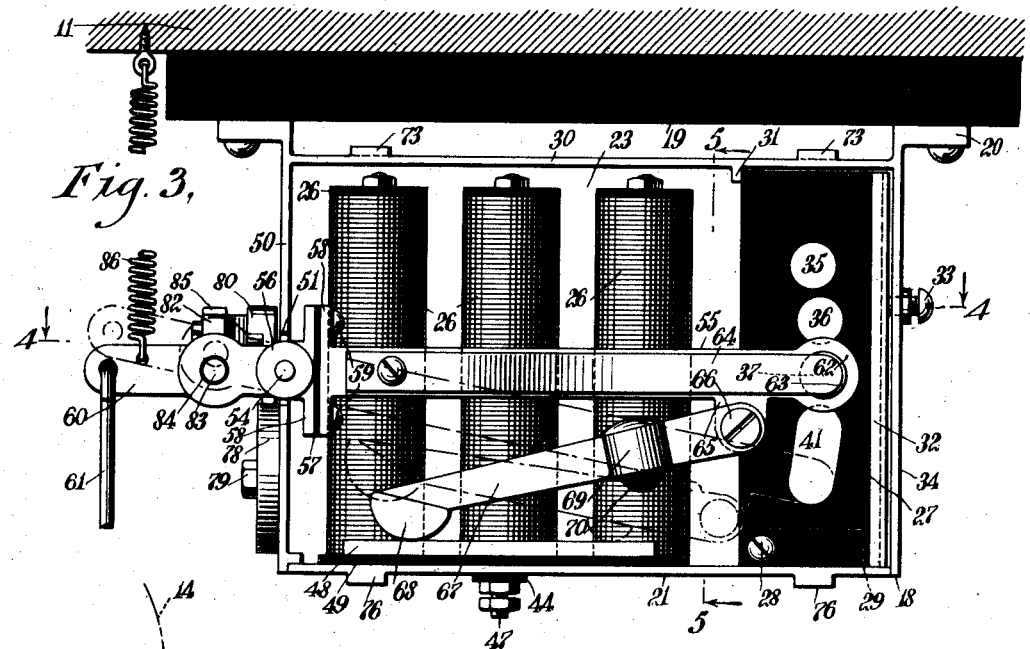
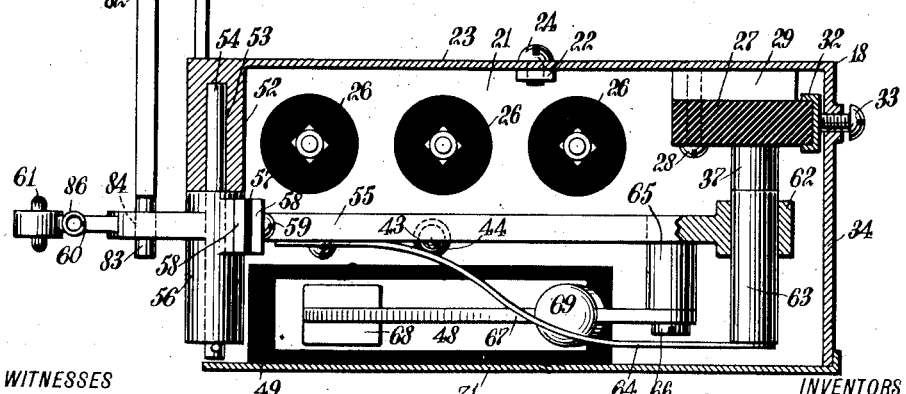
WITNESSES
Edward Thorpe
John K. Bachtezel
INVENTORS
David Wald
Otto C. Britsch
Max Taigman
BY
ATTORNEYS

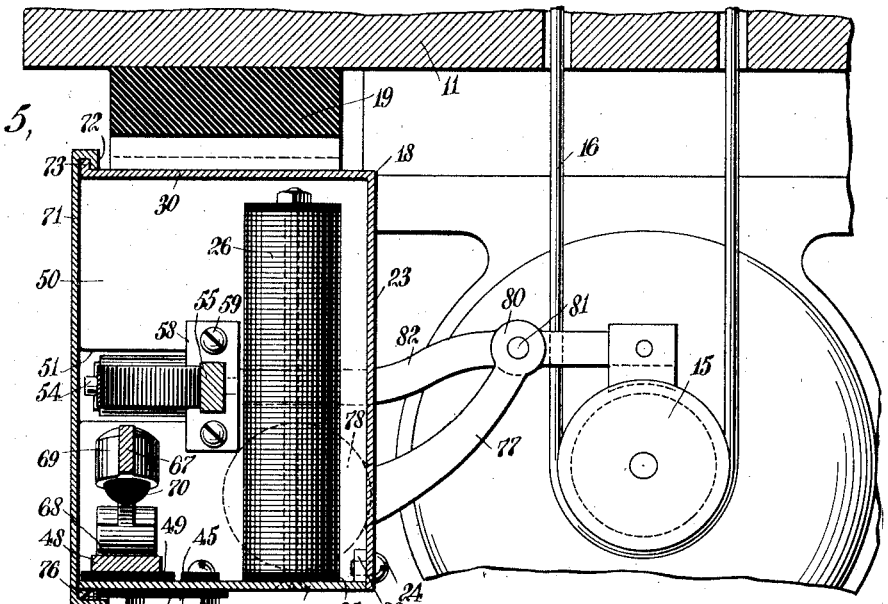
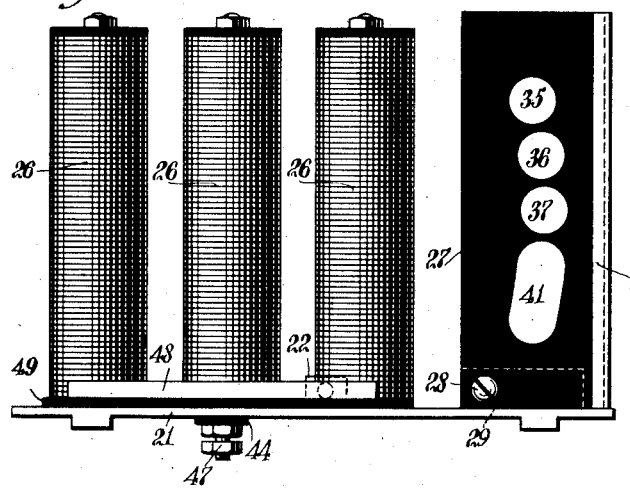
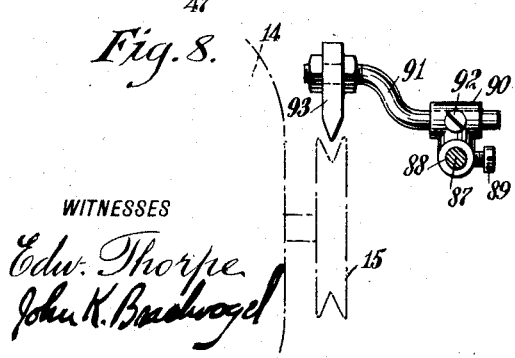
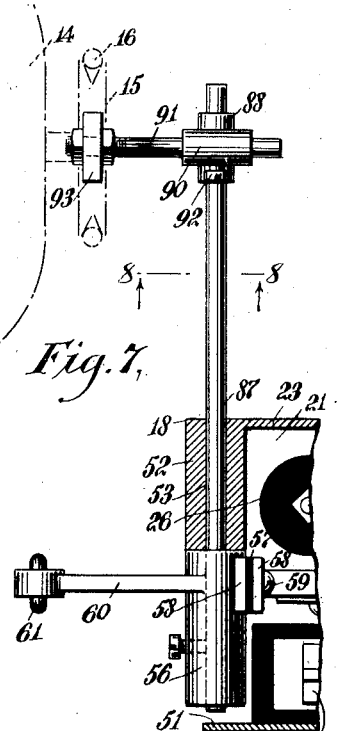

UNITED STATES PATENT OFFICE.

DAVID WALD, OTTO C. BRITSCH, AND MAX TAIGMAN, OF NEW YORK, N. Y.

MOTOR-CONTROL APPARATUS.

984,327.            Specification of Letters Patent.     Patented Feb. 14, 1911.

Application filed April 23, 1910. Serial No. 557,151.

*To all whom it may concern:*

Be it known that we, DAVID WALD and OTTO C. BRITSCH, citizens of the United States, and both residents of the city of New York, borough of Manhattan, in the county and State of New York, and MAX TAIGMAN, a citizen of the United States, and a resident of the city of New York, borough of Brooklyn, in the county of Kings and State of New York, have invented a new and Improved Motor-Control Apparatus, of which the following is a full, clear, and exact description.

This invention relates to motor control apparatus, and has reference more particularly to apparatus of this class which serves for exactly controlling the operation of electric motors, to start and stop the same, or to vary the speed, and which has resistances, means for including the resistances singly or in groups in the motor circuit, and also means for automatically stopping the motor under certain conditions.

An object of the invention is to provide simple and efficient apparatus for controlling electric motors, which can be used for various purposes, though particularly useful in connection with motor-driven sewing machines or the like, which is rapid and positive in operation, which can be operated by means of a pedal, and which, when the pedal or corresponding part is released, automatically stops the motor.

A further object of the invention is to provide motor control apparatus which can be easily and expeditiously taken apart and put together, which can be mounted in position without necessitating changes in the machine to which it is applied, and which has associated therewith a brake for bringing the motor rapidly to a stop.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of a motor-driven sewing machine having an embodiment of our invention applied thereto; Fig. 2 is a diagrammatic view showing the motor, the resistances, and the circuit-making and breaking means; Fig. 3 is a side elevation of the apparatus, having part of the casing removed; Fig. 4 is a longitudinal section on the line 4—4 of Fig. 3; Fig. 5 is a transverse section on the line 5—5 of Fig. 3; Fig. 6 is a side elevation showing the resistance coil and the contacts removed from the casing; Fig. 7 is a fragmentary, transverse section showing details of modified form; and Fig. 8 is a cross section on the line 8—8 of Fig. 7.

Before proceeding to a more detailed explanation of our invention, it should be clearly understood that while we have shown the apparatus used for controlling the motor of a sewing-machine it can be advantageously employed in connection with motors used for different purposes. In the present instance, the treadle of the sewing-machine is used to operate the control apparatus, so that the hands of the machine operator are left free for manipulating the work. A special pedal may be provided for the purpose, or other means can be used for operating the control apparatus. This and others of the constructive details can be varied in accordance with special conditions and individual preference, without departing from the underlying spirit of the invention.

Referring more particularly to the drawings, we have shown for example, a sewing-machine having supports or legs 10, a table 11 carried thereby, and a sewing mechanism 12 mounted on the table and having a pulley 13. Positioned underneath the table 11 is an electric motor 14 of any suitable form having associated therewith a driving pulley 15 operatively connected by means of a suitable belt 16, with the pulley 13. Pivotally mounted between the supports, near the lower ends thereof, is a treadle 17 which is used, as will appear hereinafter, for operating the motor control apparatus. This includes a casing 18 of metal or other suitable material secured to an insulating plate 19 by means of lugs 20 screwed or otherwise fastened in position. The insulating plate 19 is mounted in any convenient manner at the under side of the table, and may consist of a slab of slate or any other material adapted for the purpose.

The bottom 21 of the casing is removable, having at the rear edge a lug 22 adapted to be secured to the back 23 of the casing, by a suitable screw 24. Carried by the bottom, upon suitable insulating disks 25, are resistance coils 26, three or more in number and of the usual form. An insulating slab 27 is fastened by means of a screw 28, at a projection 29 of the bottom of the casing and extends upwardly to the top 30 of the casing, engaging a lug 31 of the top, which serves to hold the slab in place. A channel 32 receives the slab and is mounted upon the bottom. A screw 33 mounted in a suitable, threaded opening of the end wall 34 of the casing can be forced against the channel 32 to jam the insulating slab against the lug 31 to hold the parts in place. The insulating slab has contacts 35, 36 and 37 of metal or other suitable material. These contacts are preferably disks, and have associated therewith electrical conductors 38, 39 and 40. The conductor 38 is connected with one of the terminals of a resistance coil 26. The conductor 39 is connected with the opposite terminal of the same coil and with a corresponding terminal of an adjacent coil. The conductor 40 is connected with the opposite terminal of the last-mentioned, adjacent coil, and with the corresponding terminal of the third coil. The insulating slab has a further contact 41 of elongated form and connected by means of a conductor 42 with the remaining terminal of the last-mentioned coil 26.

A binding post 43 is arranged upon an insulating plate 44 which, together with an insulating member 45 at the inside of the bottom serves to isolate the binding post electrically from the casing. The binding post is connected by means of a conductor 46 with the conductor 38 and the terminal of the coil 26 to which this last-mentioned conductor 38 runs. A second binding post 47 is mounted upon the insulating plate 44 and is electrically connected with a metallic or other terminal plate 48 positioned within the casing on an insulating plate 49, mounted upon the bottom, for a purpose to appear hereinafter.

The end wall 50 of the casing opposite the end wall 34 has an opening 51, and adjacent thereto an extension 52 having a bore 53 in which is movably mounted a spindle 54. A contact arm 55 has a hub or barrel 56 by means of which it is mounted upon the spindle 53 and extends through the opening 51, into the casing. It is formed in two parts separated by an insulating plate 57 and has lugs 58 held together by screws 59, or in any other suitable manner. The contact arm at the outside of the casing has an extension 60 connected by means of an adjustable link 61 with the treadle 17, so that the contact arm can be operated by means of the treadle.

At the inner end, the contact arm has a collar 62 in which is slidably positioned a transverse contact stub 63, normally pressed toward the insulating slab 27 by a spring 64 mounted upon the arm and engaging at the end of the stub. The arm, at the lower edge, has a downwardly offset extension 65 to which is pivotally secured by means of a screw 66, a movable circuit-making member 67 which has at the free end a shoe 68 normally resting upon the terminal plate 48 and effecting electrical connection therewith. Intermediate its ends the circuit-making member has a recessed enlargement 69 in which is positioned a projecting stud 70 of insulating material, for a purpose to appear hereinafter.

The casing has a face plate 71 having at the upper edge undercut flanges 72 adapted to engage over lugs 73 of the top of the casing. At the lower edge, the face plate has an inwardly disposed flange 74 carrying holding screws 75 adapted to engage at the inside of inclined lugs 76 on the bottom of the casing, so that the face plate can be removably secured in position to inclose the coils and the other parts of the apparatus.

An arm 77 having an enlargement 78 is secured to the wall 50 of the casing, by means of a bolt or screw 79 passing through an opening of the enlargement. The arm at the end has an extension 80 at which is pivotally mounted, by means of a screw 81 or the like, a lever 82. The latter has an end 83 loosely received by an opening 84 near the outer end of the contact arm. The lever 82 at its free end, carries a brake shoe 85 adapted to engage the pulley 15 of the motor to bring the same to a stop when the contact arm is in its depressed position. A spring 86 is secured at the outer end of the contact arm to the pedal 11 of the machine, and tends to hold the contact in a normal position.

In the operation of the device, when the user presses on the treadle 17, the arm is swung upward and moves along the contact 41, until the circuit-making member 67 reaches a position such that the insulating stud 70 is disengaged from the terminal plate 48, and the shoe 68 is brought into engagement with the plate, to close the circuit. Current will then flow through all three of the resistance coils to the motor. By depressing the treadle further, the arm is moved to the next contact, that is to the contact 37, thereby cutting out one of the coils. To bring the motor to a higher speed the arm is moved upward still farther, until it engages the contact 36 and then 35. The remaining resistance coils being thereby successively cut out of the circuit. When it is desired to stop the motor, the pressure upon the treadle is released, and the spring 86 thereupon returns the parts to their original positions. As soon as the insulating stud 70 engages the terminal plate, the shoe 68 is disengaged from the latter and the circuit is broken.

In Figs. 7 and 8 we have illustrated a modified form of our invention in which the spindle 87, corresponding to the spindle 53, is extended through the casing and at its outer end has a sleeve 88 secured thereon by means of a set screw 89. The sleeve 88 carries rigidly, a transverse sleeve 90 in which is positioned a rod 91 held in place by a set screw 92. The rod 91 carries a brake shoe 93 adapted to engage the pulley 15, so that when the spindle is pivotally operated by the movement of the contact arm the brake shoe is brought into or out of engagement with the pulley.

While we have shown and described, for example, the form of our invention which is controllable by a treadle adapted to be actuated by the foot of the operator of the machine, any other device controllable at will by the operator, for maintaining the arm operative against the tension of the spring can be used with equal advantage under certain circumstances. We do not wish to limit ourselves to this feature, as well as to others of the constructive details, and shall, in the claims hereinafter, employ the term "means for manually controlling the contact arm" in a generic sense.

Having thus described our invention, we claim as new, and desire to secure by Letters Patent:—

1. In apparatus of the class described, a plurality of resistances, a movable contact arm, a plurality of contacts, each electrically connected with one of said resistances, said contact arm being adapted to engage each of said contacts to form an electrical connection therewith, a circuit-making member associated with said arm, said member being operative when said arm is in engagement with each of said contacts, said member being inoperative, furthermore, when said arm in in engagement with one of said contacts.

2. In apparatus of the class described, a movable contact arm having movably associated therewith a circuit-making member, a terminal adapted to be engaged by said member to form an electrical connection therewith, a plurality of contacts each adapted to be engaged by said arm when said member is in engagement with said terminal, and means carried by said member whereby said member is out of electrical contact with said terminal when said arm is in engagement with one of said contacts.

3. In apparatus of the class described, a plurality of resistance coils, a plurality of contacts, conductors connecting said contacts and said coils, a movable contact arm adapted to engage each of said contacts, a terminal, a motor, conductors connecting said terminal, said motor and said coils, and a circuit-making member movably associated with said arm and adapted to engage said terminal to form an electrical connection therewith when said arm is in engagement with each of said contacts, said member having an insulating part adapted to engage said terminal to break the circuit when said member is in a predetermined position.

4. The combination, with a motor, of control apparatus comprising a plurality of resistances, contacts electrically connected with said resistances, a terminal, conductors for connecting said terminal and said motor with a source of electrical supply, a conductor connecting said motor and said resistances, said contacts being insulated from one another, a movable contact arm adapted to engage each of said contacts to form an electrical connection therewith, and a circuit-making member movably associated with said arm and adapted to engage said terminal to form an electrical connection therewith when said arm is in engagement with each of said contacts, said member having an insulated part adapted to engage said terminal, whereby said member is out of electrical connection therewith, one of said contacts being of elongated form, whereby said member can both be in electrical connection or out of electrical connection with said terminal, while in engagement with said last-mentioned contact.

5. The combination, with a motor, of control apparatus comprising a plurality of resistance coils, contacts insulated from one another, a movable contact arm adapted to engage said contacts, a terminal, conductors connecting said terminal and said motor with a source of electrical supply, a conductor connecting said motor with one of said coils and one of said contacts, further conductors connecting the others of said contacts with said coils, and a movable circuit-making member associated with said contact arm and adapted to engage said terminal and having an insulating part adapted to engage said terminal in one position of said member.

6. The combination, with a motor, of control apparatus comprising a plurality of resistance coils, contacts insulated from one another, a movable contact arm adapted to engage said contacts, a terminal, conductors connecting said terminal and said motor with a source of electrical supply, a conductor connecting said motor with one of said coils and one of said contacts, further conductors connecting the others of said contacts with said coils, a movable circuit-making member associated with said contact arm and adapted to engage said terminal, a spring tending to maintain said contact arm inoperative, and means for holding said arm in operative position against the tension of said spring, said circuit-making member having an insulated part adapted to engage the terminal, whereby said member is out of electrical connection therewith.

7. Apparatus of the class described, comprising a plurality of resistances, a terminal, conductors for connecting said terminal and said resistances with a motor, a movable contact arm, a circuit-making member associated with said arm and adapted to engage said terminal, contacts, each adapted to be engaged by said arm, and conductors connecting said contacts and said resistances, whereby said resistances are successively included in or excluded from the motor circuit, when said arm is brought into successive engagement with said contacts, said circuit-making member having an insulated part, whereby when said arm is in a predetermined position said part engages said terminal to break the motor circuit.

8. Apparatus of the class described, comprising a plurality of resistances, a terminal, conductors for connecting said terminal and said resistances with a motor, a movable contact arm, a circuit-making member associated with said arm and adapted to engage said terminal, contacts, each adapted to be engaged by said arm, and conductors connecting said contacts and said resistances, whereby said resistances are successively included in or excluded from the motor circuit, when said arm is brought into successive engagement with said contacts, said circuit-making member having an insulated part, whereby when said arm is in a predetermined position said part engages said terminal to break the motor circuit, one of said contacts being elongated, whereby said member can be in electrical engagement with said terminal or out of electrical engagement therewith when said arm is in engagement with said last-mentioned contact.

9. Apparatus of the class described, comprising a casing, resistance coils mounted therein, a terminal insulated from said casing, an insulating slab, contacts mounted upon said slab, a pivoted contact arm adapted to engage said contacts, a circuit-making member pivotally carried by said arm and adapted to engage said terminal, and means for operating said arm.

10. Apparatus of the class described, comprising a casing, resistance coils mounted therein, a terminal insulated from said casing, an insulating slab, contacts mounted upon said slab, a pivoted contact arm adapted to engage said contacts, a circuit-making member pivotally carried by said arm and adapted to engage said terminal, manually controllable means for operating said arm, a spring tending to hold said arm in a predetermined position, said circuit-making member having an insulated part adapted to engage said terminal to break the circuit in a predetermined position of said arm, and means for electrically connecting said terminal and said contacts with a motor circuit.

11. Apparatus of the class described, comprising a casing having a removable bottom, resistances carried by said bottom, contacts carried by said bottom and connected with said resistances, a movable contact arm pivoted with respect to said casing and adapted to engage said contacts, and a removable face plate adapted to be secured to said casing and said bottom thereof.

12. Apparatus of the class described, comprising a casing having a back, a top and end walls, a removable bottom having a lug, said back having a screw adapted to be secured at said lug to hold said bottom in position, a face plate having undercut flanges at the upper edge, said top having lugs adapted to be received by said flanges, said bottom having inclined lugs, said face plate, at the lower edge having a laterally disposed flange provided with screws adapted to engage said inclined lugs to secure said face plate in position, resistances within said casing, contacts associated with said resistances, and a contact arm pivoted at an end wall of said casing and adapted to engage said contacts.

13. Apparatus of the class described, comprising a casing having a back, and an end wall, a bottom removably secured to said back, an insulating slab mounted upon said bottom, said casing having a top provided with a lug, said slab being arranged to abut against said lug, means carried by said end wall for clamping said slab against said lug, resistances carried by said bottom, contacts carried by said slab and electrically connected with said resistances, and a contact arm adapted to engage said contacts.

14. In apparatus of the class described, a casing having a back, an end wall and a top, said top having an inwardly extending lug, a removable bottom secured to said back, an insulating slab mounted upon said bottom and adapted to engage said lug, a channel receiving an edge of said slab, a screw mounted at said end wall and adapted to engage said channel to force said slab against said lug, resistance coils mounted upon said bottom, a pivoted contact arm projecting into said casing, and contacts mounted upon said slab and adapted to be engaged by said arm, said contacts being electrically connected with said coils.

15. In apparatus of the class described, a casing having an end wall provided with an opening therein, resistances within said casing, contacts within said casing and electrically connected with said resistances, said end wall adjacent to said opening having an enlargement, presenting a bore, a spindle in said bore, and a contact arm having a hub mounted upon said spindle, and extending through said opening into said casing, and adapted to engage said contacts.

16. In apparatus of the class described, a casing having an end wall provided with an opening therein, resistances within said casing, contacts within said casing and electrically connected with said resistances, said end wall adjacent to said opening having an enlargement, presenting a bore, a spindle in said bore, a contact arm having a hub mounted upon said spindle and extending through said opening into said casing and adapted to engage said contacts, said arm, at the outside of said casing having an extension, a lever pivotally mounted upon said casing and operatively engaged by said extension of said arm, and a brake-shoe carried by said lever and adapted to brake a motor controlled by the apparatus.

In testimony whereof we have signed our names to this specification in the presence of two subscribing witnesses.

DAVID WALD.
OTTO C. BRITSCH.
MAX TAIGMAN.

Witnesses:
JOHN K. BRACHVOGEL,
PHILIP D. ROLLHAUS.